United States Patent
Koistinen

(10) Patent No.: US 12,367,852 B2
(45) Date of Patent: Jul. 22, 2025

(54) TABLE STRINGED MUSICAL INSTRUMENT AND METHOD FOR MANUFACTURING A TABLE STRINGED MUSICAL INSTRUMENT

(71) Applicant: Hannu Koistinen, Rääkkylä (FI)

(72) Inventor: Hannu Koistinen, Rääkkylä (FI)

(*) Notice: Subject to any disclaimer, the term of this patent is extended or adjusted under 35 U.S.C. 154(b) by 0 days.

(21) Appl. No.: 17/919,517

(22) PCT Filed: Apr. 16, 2021

(86) PCT No.: PCT/FI2021/050280
§ 371 (c)(1),
(2) Date: Oct. 17, 2022

(87) PCT Pub. No.: WO2021/209688
PCT Pub. Date: Oct. 21, 2021

(65) Prior Publication Data
US 2023/0169941 A1 Jun. 1, 2023

(30) Foreign Application Priority Data
Apr. 17, 2020 (FI) .................................. 20205393

(51) Int. Cl.
*G10D 1/12* (2006.01)
*F21V 33/00* (2006.01)
(Continued)

(52) U.S. Cl.
CPC .......... *G10D 1/12* (2013.01); *F21V 33/0056* (2013.01); *G06F 3/016* (2013.01); *G06F 3/017* (2013.01); *G10D 3/00* (2013.01)

(58) Field of Classification Search
CPC .. G10D 1/12; G10D 3/00; G10D 1/09; G10D 1/08; F21V 33/0056; G06F 3/016; G06F 3/017
See application file for complete search history.

(56) References Cited

U.S. PATENT DOCUMENTS

| 173,478 A | * | 2/1876 | Langmaak | ............... G10D 1/12 |
| | | | | 84/285 |
| 477,493 A | * | 6/1892 | Bessier, V | ............... G10D 1/12 |
| | | | | 84/285 |

(Continued)

FOREIGN PATENT DOCUMENTS

| CN | 206806001 U | * | 12/2017 |
| CN | 207663775 U | * | 7/2018 |

(Continued)

OTHER PUBLICATIONS

International Search Report dated Jun. 23, 2021, for PCT/FI2021/050280, 4 pages.

(Continued)

*Primary Examiner* — Robert W Horn
(74) *Attorney, Agent, or Firm* — NIXON & VANDERHYE

(57) ABSTRACT

A table stringed musical instrument includes string fastening members in an instrument structure. The string fastening members receive and fasten strings to the instrument structure. The instrument is a free stringed musical instrument configured for one or more, advantageously at least two or four or more players so that the string fastening members are grouped for at least two, advantageously at least four or more physically separate groups and additionally so that the strings to be received and fastened are thereby grouped for at least two or four or more separate groups and thereby for at least two or four or more different player positions. The first group of the string fastening members receives the first group of strings. The second group of the string fastening members receives the second group of strings, etc. The strings of the first group differ from those of the second group.

20 Claims, 2 Drawing Sheets

(51) Int. Cl.
*G06F 3/01* (2006.01)
*G10D 3/00* (2020.01)

(56) References Cited

U.S. PATENT DOCUMENTS

| | | | | |
|---|---|---|---|---|
| 653,550 | A * | 7/1900 | Eulert et al. | G10D 1/12 84/285 |
| 672,270 | A * | 4/1901 | Green | G10D 1/12 84/285 |
| 694,094 | A * | 2/1902 | Duerst | G10D 1/12 84/285 |
| 721,127 | A * | 2/1903 | Kelnhofer | G10D 1/12 84/285 |
| 737,693 | A * | 9/1903 | Audet | G10D 1/12 84/285 |
| 832,157 | A * | 10/1906 | Platts | G10D 1/08 84/263 |
| 892,908 | A * | 7/1908 | Sorglechner | G10D 1/12 84/285 |
| 963,588 | A * | 7/1910 | Krienitz | G10D 1/12 84/285 |
| 1,241,639 | A * | 10/1917 | Luis | G10D 1/08 84/263 |
| 1,390,004 | A * | 9/1921 | Winquist | G10D 1/12 84/322 |
| 2,820,389 | A | 8/1955 | Marx | |
| 3,233,495 | A * | 2/1966 | Bernardi | G10D 3/02 84/294 |
| 3,633,452 | A * | 1/1972 | Beasley | G10D 1/10 84/307 |
| 5,824,929 | A * | 10/1998 | Freeland | G10D 3/14 84/DIG. 18 |
| 7,678,979 | B1 | 3/2010 | Roop | |
| 7,935,876 | B1 | 5/2011 | West | |
| 9,583,077 | B2 * | 2/2017 | Cockcroft | G10D 1/085 |
| 10,002,600 | B1 * | 6/2018 | Owens | G10H 1/46 |
| 2003/0131721 | A1 * | 7/2003 | Minakuchi | G10H 3/18 84/726 |
| 2010/0094443 | A1 | 4/2010 | Oh et al. | |
| 2021/0287640 | A1 * | 9/2021 | Gilmore | H05B 47/105 |
| 2023/0090995 | A1 * | 3/2023 | Wang | G10H 1/0016 84/610 |
| 2023/0169941 | A1 * | 6/2023 | Koistinen | F21V 33/0056 84/285 |

FOREIGN PATENT DOCUMENTS

| | | | | |
|---|---|---|---|---|
| DE | | 9141 | 7/1879 | |
| DE | | 332033 | 2/1920 | |
| DE | 202019004047 | U1 * | 12/2019 | |
| JP | 2016148695 | A * | 8/2016 | |
| WO | WO-2017029663 | A1 * | 2/2017 | G10D 1/08 |

OTHER PUBLICATIONS

Written Opinion of the ISA dated Jun. 23, 2021, for PCT/FI2021/050280, 10 pages.
Finnish Search Report dated Aug. 4, 2021, for FI 20205393, 2 pages.
Juupaluoma J., Ida Elinan Tekemat pop-coverit mullistivat kantel, pp. 1-15.

* cited by examiner

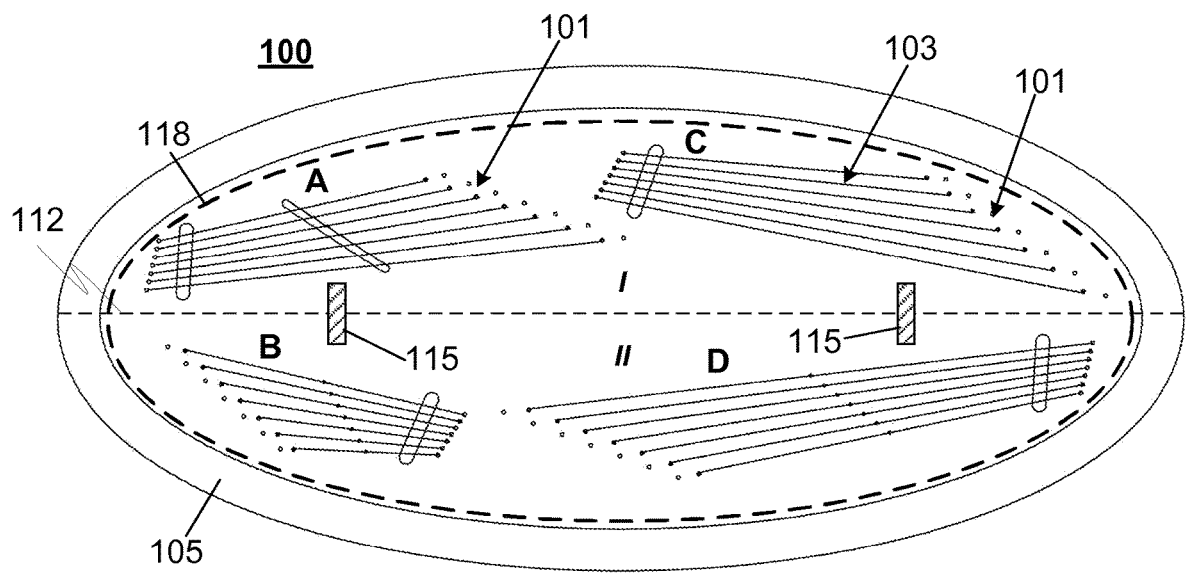
FIG. 3
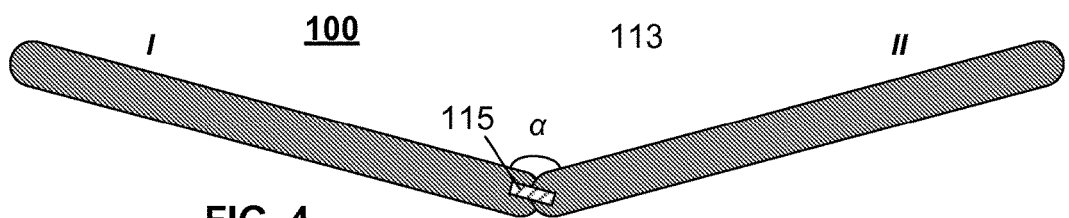
FIG. 4
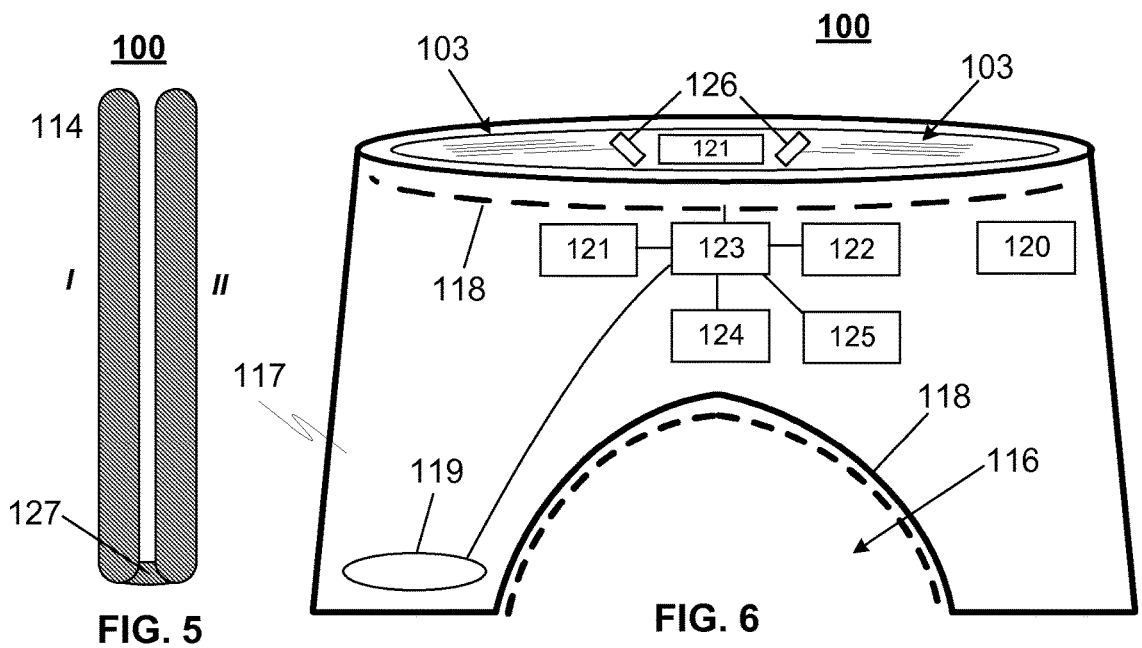
FIG. 5
FIG. 6

TABLE STRINGED MUSICAL INSTRUMENT AND METHOD FOR MANUFACTURING A TABLE STRINGED MUSICAL INSTRUMENT

This application is the U.S. national phase of International Application No. PCT/FI2021/050280 filed Apr. 16, 2021 which designated the U.S. and claims priority to FI 20205393 filed Apr. 17, 2020, the entire contents of each of which are hereby incorporated by reference.

TECHNICAL FIELD OF THE INVENTION

The invention relates to a table stringed musical instrument, in particularly to a Finnish zither or Kantele. In more details the invention relates to a table stringed musical instrument having plurality of string fastening members, such as tuner pins, for receiving and fastening plurality of strings. In addition the invention relates to a method for manufacturing the table stringed musical instrument.

BACKGROUND OF THE INVENTION

Number of table stringed musical instruments is known, such as a traditional Finnish Zither (or Kantele), which comprises a deck and hollow soundboard below the deck and a string group having plurality of strings arranged to the deck portion of the instrument. Typically smallest versions of Kantele have 15 or fewer strings, but the larger modern concert Kantele may have up to 40 strings, for example.

There are however some details and disadvantages relating to the known prior art table stringed musical instruments, such as being quite challenging and often setting a bar to start to play said musical instrument very high. Often a starter must practice several months or years to being able to play as a solo or even being a member of a band or an orchestra. In addition as a single individual musical instrument the Finnish zither is demanding instrument to play alone without any other instruments, namely possible errors will be distinguished very easily and the player needs to be very skillful. In addition the experience of playing might be isolated when playing the table stringed musical instrument, such as the Finnish zither, as a solo and alone.

SUMMARY OF THE INVENTION

An object of the invention is to alleviate and eliminate the disadvantages relating to the known prior art. Embodiments of the invention may provide a table stringed musical instrument with a lower bar or threshold to start to play the instrument as the prior art instruments do, as well as to create a common playing experience, natural interaction and shared experience between players. In addition embodiments of the invention may provide a comprehensive table stringed musical instrument with comprehensive playing and musical experience.

The object of the invention can be achieved by the features of independent claims.

The invention relates to a table stringed musical instrument. In addition the invention relates to a manufacturing method of the table stringed musical instrument.

According to an embodiment of the invention a table stringed musical instrument comprises plurality of string fastening members, such as tuner pins, arranged to an instrument structure, for example to a deck. The string fastening members are arranged for receiving and fastening plurality of strings to the instrument structure. In particularly the table stringed musical instrument according to the embodiments of the invention is a free stringed musical instrument and is configured for one or more, advantageously at least two or four or more players so that the string fastening members are grouped for at least two, advantageously at least four or more physically separate groups and additionally so that the strings to be received and fastened are thereby grouped for at least two or four or more separate groups and thereby for at least two or four or more different player positions so that the first group of the string fastening members is configured to receive the first group of strings and the second group of the string fastening members is configured to receive the second group of strings and so on. In addition the strings of the first group are different strings than the strings of said second group.

The free stringed musical instrument means that the both ends of each string is attached to one string fastening member, so one string is attached to the two string fastening members. According to embodiments the free string is configured to resonate freely at the whole length of the string between said two string fastening members to which said string is attached. So in practice when plucked or picked the strings vibrate freely between the string fastening members.

According to an embodiment the instrument comprises also a frame, which advantageously circulates the deck and whereupon the deck is attached or integrated to the frame. According to an example the frame and the deck may be a unified structure made of the same base material, such as a single wood structure. The frame mechanically protects the deck structure or deck surface and thereby also the strings and string fastening members. In addition the frame will have an effect for the resonance properties of the deck so that the resonance will be happened in a control and desired manner and in a balance.

According to an embodiment the different groups of the string fastening members are advantageously configured to be tuned together with the strings fixed to the pins so to form differentially tuned playing entity. As an example the different groups of the tuner pins can be arranged to tune (so to change the tension) the strings for the same tone but different scale or octaves. According to these features and by tuning the different groups in different way, such as one group as a pentatonic tuning and one another group as a blues tuning, the playing and experience feeling is very comprehensive and so that "no one can play it wrong" because the toning of different groups sounds harmoniously together. The tuning may naturally be anything, but it has noticed that the instrument will function very well when the different groups are tuned differently, such as one with blues scale, second with pentatonic scale, third with diatonic scale, and fourth with chromatic scale, only as mentioning examples.

According to an embodiment the deck of the table structure comprises an elliptical shape for allowing positioning different groups of string fastening members for different area of said deck and thereby for allowing one or advantageously more players for playing the different groups of strings in the different player positions. The string fastening members and the strings can be arranged in different forms to the deck, such as for example the shortest strings of each group (two string fastening members with the shortest distance and for receiving the same string) to closest the peripheral area of the elliptical shape of the table structure and the longest string of each group (two string fastening members with the longest distance and for receiving the same string) to farthest from the peripheral area of the elliptical shape of the table structure.

In addition the deck may have different profiles. As an example the deck might have an elliptical shape as in the first plane, but at the same time having a convex cross-section shape so the center area is higher than the peripheral area of the deck portion. The convex cross-section shape is advantageously achieved by providing tension to the structure of the instrument and especially to the deck portion of the instrument. By this a very strong sound can be achieved. In addition also the material selection of the instrument, frame structure and the deck may provide a strong sound for the instrument. Naturally also the soundboard can be used for making an effect to the sound of the instrument.

The instrument advantageously comprises a support structure below the table structure, which is mostly for making the structure more stronger, but possibly also having effect to sounds and acoustic of the instrument. As an example the support structure may be physically coupled with the string fastening members thereby receiving and dividing the tension of the strings attached and toned by the string fastening members to the other structural portions of the instrument. The instrument may also comprise a soundboard, which can be either permanently integrated or attached in a detachable way to the instrument structure. The soundboard may also be as a unified structure with the instrument structure and made e.g. from the same piece, such as a wood piece, as the instrument structure. This can be achieve for example by milling the soundboard to the original base structure.

The construction material of the instrument is advantageously heat-treated or thermally processed wood, natural fiber component, homogenized wood, plywood or dry wood, as an example. It is to be noted that different wood species can be selected and used. In addition it is to be noted that the construction material may also comprise or even made of metal or plastic.

In addition according to an embodiment the instrument may also comprise at least one percussive structure, such as surface or element having different properties than the other portion of the instrument structure. As an example the percussive structure comprises different building material than the rest of the instrument or same building material than the rest of the instrument but with different density or other property, thereby generating different sound in response to an impact, such as hand drumming, or drumming with hi-hat, snare or the like sounds. The percussive structure may be arranged for example to or on the deck of the table of the instrument, but naturally also other portions can be applied, such as a frame or possible integrated or attached stand structure. It is to be noted that the instrument may also comprise at least one fingerboard section.

Furthermore, according to an embodiment of the invention and in order to make the instrument more comprehensive and the sound more experiential, the instrument comprises also a resonance or vibrating modulator for vibrating a component of the instrument, such as the strings or at least few strings or the deck or other portion of the instrument thereby generating chorus, stronger sounds and/or directing sounds. The resonance or vibrating modulator may for example comprise a magnetic resonance or electric vibrating modulator having at least one magnetic coil and/or a rotating permanent magnet. The modulator can be arranged for generating changing magnetic field and thereby for vibrating component of the instrument, such as the strings or other magnetic material comprised by the instrument. According to an embodiment magnetic material can be inserted or integrated into the structure of the instruments, such as a frame element, possible stand element or to the deck structure. This allows for generating chorus, stronger sounds and/or directing sounds.

Still according to an embodiment of the invention the table structure of the instrument can be divided physically in first and second portions. The dividing can be done physically but also so that the two portions have different acoustic properties, such as different tensions on the deck portions or different other properties, like different materials, masses or densities in the structures, for example in the deck portions. The dividing can be done along a dividing line across the deck so that the first group of the string fastening members is arranged in the first portion and the second group of the string fastening members is arranged in the second portion.

In addition the dividing may be implemented so that the instrument is folded along the dividing line so that the first and second portions form at least two different modes, where the first mode is a playing mode and the second mode is a transportation or storage mode of the instrument. In the playing mode the first and second portions may be in a planar mode or in a level or alternatively having a certain angle deviating from the 180°, either less or more that 180°. The dividing and/or tilting the first and second portions can offer different acoustic properties and at least change the playing positions for the players and thereby providing ergonomically suitable instrument for different size persons and/or for providing acoustically different sound environment.

According to an embodiment the instrument may have a joint or guiding member between the first and second portions when divided. The joint member can be configured to connect the first and second portions to each other acoustically so that the playing the instrument at the first portion will also cause some resonance and acoustical coupling with the second portion, and vice versa. Advantageously the whole instrument (so also the other portion) resonates as a one structure via the joint member between the portions. As an example the joint member may comprise a hollow tube, for example, or material having greater density than the base material of the first and second portions. The joint member may be foe example metal or wood rod, and the instrument may comprise one or more of those joint members.

Additionally the instrument may comprise a hollow structure below the table structure for allowing a person entering at least partly inside the instrument and thereby allowing still more comprehensive musical experience. According to an embodiment the instrument may have a stand, either integrally fixed or detachably attached stand, to which said instrument is attached, and whereupon the space or the hollow structure is arranged into the stand.

Still according to an embodiment the instrument may have different accessories, such as lights, like LED-lights, as well as smoke machines or the like. The lights can be arranged into the deck structure or to the frame structure, to the hollow structure (so inside the instrument) or to the peripheral area of the elliptical deck structure. In addition the light, as well as the other accessories, may be activated when a person is entering near the instrument or entering inside the instrument. For this the instrument advantageously comprises a motion detector and/or an interactive device, which is configured to control the light or other accessories when a motion or a person is detected nearby and/or inside the instrument, as an example. Advantageously the detection is performed in a non-contact way, and the detector may be implemented e.g. by a brightness detector or a camera, as an example. It is to be noted that the lights can be used for illuminating the playing area on the deck or strings in the groups. In addition the lights can be controlled interactively based on the detected movements, positions and/or gestures of the players or peoples around and/or next the instrument. In addition the device may have a memory device having a pre-stored program for controlling and manipulating the accessories, such as the lights, of the instrument.

According to an embodiment the instrument comprises an interactive device for providing interactivity between the instrument and the player(s) so that when the motion detector detects (advantageously in a non-contact way) motions, positions and/or gestures of at least one player and, for example, the interactive device is configured to generate a certain control data to a controller for controlling effects to acoustics, sound effects, tones, mixing, looping, chorus, stronger sounds and/or directing sounds and/or accessories, such as lights, based on the motions, positions and/or gestures detected by the motion detector.

In more details the instrument comprises a controller, which is coupled with the interactive device and possible motion detector, cameras or other detecting devices detecting the environment and people near the instrument, as well as coupled with the accessories, such as lights and other modulator or devices, which can manage or generate effect to acoustics, sound effects, tones, mixing, looping, chorus, stronger sounds and/or directing sounds. When the possible motion detector, cameras or other detecting devices detects any parameter changing in the environment, such as coming person or a certain gesture, motion or position of the player, it generates a signal to the controller. Based on this the controller ask a response from the interactive device so how to control the accessories due to a certain determined motion, position or gesture, as an example. Then, based on the response from the interactive device the controller is configured to control the accessories, such as the lights and effect generating devices. As an additional example one of the controlled devices may be an electrically controlled module, which generates e.g. vibra. This can be implemented e.g. by a Theremin oscillator, but naturally also other devices, modulators, oscillators or methods can be applied.

Further, according to an embodiment, the instrument may also comprise, in addition to the controller, a memory device and/or data communication device for example for receiving an external control data e.g. from an USB memory device or a via short radio communication link. The external control data may be for example data related to effects carried by the player with the USB memory device or in his/her mobile communication device, whereupon the data can be loaded to the memory device of the instrument and thereby used for controlling the effect or light or other devices of the instrument.

According to an embodiment the instrument may also comprise an automatic tuner mechanism, wherein the controller can manage and operate the tuner mechanism or at least some portion of the string fastening members for changing tone of at least one string, advantageously for changing tone of each string fastening members group according to toning data. The toning data can be previously stored to the memory device or received via the data communication device, such as the USB device or via a wireless way, like Bluetooth, WLAN or via mobile communication links, like 4G or the like, as an example. The controller can manage the automatic tuner mechanism to tune for example each group to a certain tone or scale in relation to each other, such as blues or pentatonic or the like, for example. The controller may also store and/or send data related to the current toning for a later use.

It is to be noted that the automatic tuner mechanism can tune the strings by manipulating the string fastening members either when the instrument is not played but also during the playing.

Still in addition the instrument may also comprise microphones, like magnetic or contact microphones, rhythm generating machine, looper, amplifier, device for generating effects, as well as different volume and echo controllers, as an example. Furthermore the instrument may also comprise integrated cameras, such as 360° camera in the middle portion of the deck area of the instrument, or multiple smaller cameras around the deck of frame portion for imaging (still and/or video) the players and possibly also detecting the motions, positions and gestures and thereby functioning as the motion detector and generating control signals to the interactive device and the controller, for example.

The present invention offers advantages and new experiences over the known prior art, such as enabling plurality of players to play the same instrument. In particularly the present invention offers and provides an instrument, where the same soundboard vibrates, connects and creates and shares a common and comprehensive playing experience and creates natural interaction between players, where the every player can feel the vibration of the instrument as a response to the playing of each players, for instance. The instrument of the present invention also lowers the bar or threshold also for beginners or inexperienced person to start to try or play the instrument because the instrument has number of playing positions thus decreasing the playing responsibility of each individual players for example when compared to a solo instrument. In addition the accessories and other additional features of the instrument, such as lights and percussive areas as examples, are developed so to encourage and inspire the people to join and play. Furthermore it is to be noted that the instrument may offer a base elements for a whole band, because the same instrument may have a bass, higher scales, percussion and different effects, for example.

The exemplary embodiments presented in this text are not to be interpreted to pose limitations to the applicability of the appended claims. The verb "to comprise" is used in this text as an open limitation that does not exclude the existence of also unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific example embodiments when read in connection with the accompanying drawings.

BRIEF DESCRIPTION OF THE DRAWINGS

Next the invention will be described in greater detail with reference to exemplary embodiments in accordance with the accompanying drawings, in which:

FIGS. 1-6 illustrate principles of different exemplary table stringed musical instruments according to advantageous embodiments of the invention.

DETAILED DESCRIPTION

Figure 1:
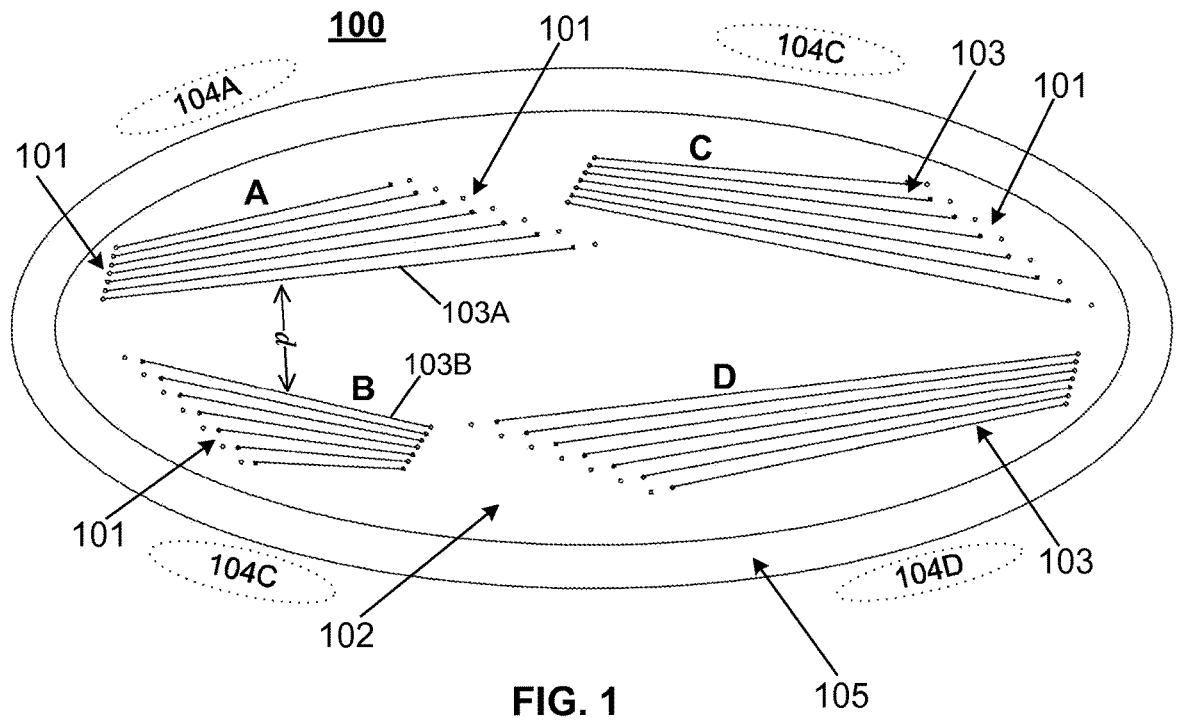

FIGS. 1-6 illustrate principles of different exemplary table stringed musical instruments 100 according to advantageous embodiments of the invention, wherein the instrument 100 comprises plurality of string fastening members 101 and a deck 102 to which the string fastening members 101, such as tuner pins, are attached. For the playing purposes plurality of strings 103 are attached to the tuner pins 101.

As can be seen in Figures the string fastening members 101 are arranged to separate groups A, B, C and D where the average distance d between the closest strings 103A, 103B of the adjacent groups A, B is multiple times (advantageously at least 2 times, more advantageously at least 4 times, and most advantageously at least 6 times) the distance of the strings in the each individual group. The distance of the adjacent strings in the individual group can vary, but is according to an example between 5-20 mm. In the embodiments illustrated in the Figures the strings 103 are arranged to four different groups A-D and thus the instrument comprises four player positions 104A, 104B, 104C, 104D and is therefore designed even for four players.

It is to be noted that the spacing between the strings 103 (so the string fastening members 101) in each group may corresponds to each other or vary from group to group for example so that the spacing between the strings 103 in the first group might be longer than in the second group. In addition the spacing of the strings 103 may be constant (in the same group or also between the adjacent groups) or vary, such as vary continuously and being angeled, for example.

The different groups of the string fastening members 101 and thus the strings 103 fixed to the pins can be tuned separately and therefore to form differentially tuned playing entity, such as same tone but different scale or octaves. In the practice the pins and thus the strings are tuned by changing the tension of the strings by e.g. turning the string fastening members 101 (the pins).

The deck 102 of the table structure has advantageously an elliptical shape so that the different groups A-D of the string fastening members 101 can be positioned for different areas of the deck, thereby providing different player positions 104A, 104B, 104C, 104D around the elliptical shaped table structure. Thus one or advantageously more than one players can play the different groups of the strings in the different player positions.

The string fastening members and thus the strings can be arranged in different forms. Due to the elliptical shape the shortest strings 103 of each group are arranged closest to the peripheral area 105 of the elliptical shape of the table structure and the longest string of each group are arranged farthest from the peripheral area 105 of the elliptical shape of the table structure, such as to a frame 105. Naturally also other forms can be applied and the scope of the invention is not limited to this only.

Figure 2:
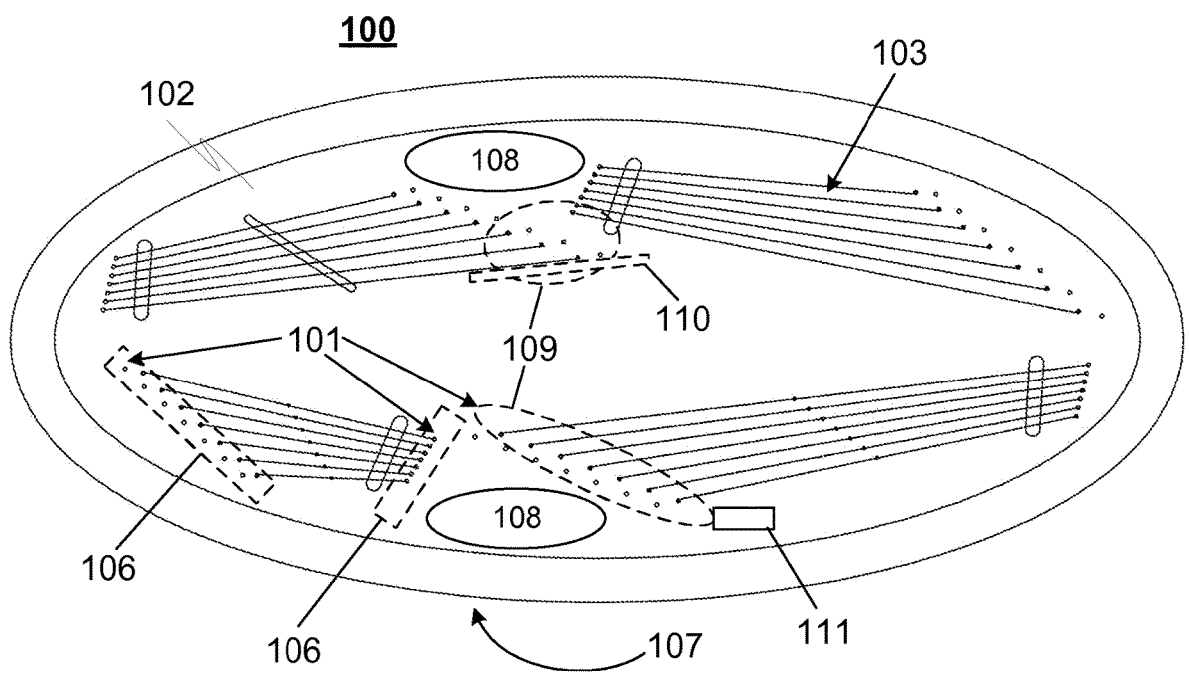

The instrument advantageously comprises a support structure 106 below the table structure, as can be seen in FIG. 2, to which the string fastening members 101 are fastened through the deck 102. The instrument may also comprise a soundboard 107, as well as at least one percussive structure 108. The percussive structure may comprise for example a surface area on the deck 102 or in other portion of the instrument.

The instrument 100 may also comprise a resonance or vibrating modulator 109 for vibrating a component of the instrument. The resonance or vibrating modulator 109 comprises advantageously a magnetic resonance or electric vibrating modulator having at least one magnetic coil and/or a rotating permanent magnet. The modulator 109 can be arranged so that generated changing magnetic field will vibrate directly the string fastening members 101 or strings 103. Alternatively or in addition to the instrument may also comprise magnetic material 110 integrated to the structure, such as to the deck, of the instrument, which is resonated by the modulator 109 and which again resonates the instrument structure and thereby provides a certain effect to the sound. The instrument may comprise a resonator controller 111 for controlling the resonator's frequency.

As can be seen in FIG. 3 the table structure of the instrument can be divided physically along a dividing line 112 and across the deck 102 to first and second portions I and II so that the first group A of the string fastening members 101 is arranged in the first portion I and the second group B of the string fastening members 101 is arranged in the second portion II. The instrument can be folded along the dividing line 112 so that the first I and second II portions form at least two different modes as is illustrated in FIGS. 4 and 5, where FIG. 4 illustrates the first mode 113 which is a playing mode and the FIG. 5 illustrates a second mode 114 which is a transportation or storage mode of the instrument. The first and second portions I, II are advantageously hinged to each other with a hinge 127. The hinge can be advantageously locked to at least one, advantageously more positions.

The first and second portions may be in a planar mode or in a level or alternatively having a certain angle α deviating from the 180°, as can be seen in FIG. 4. Naturally the angle can be either less or more that 180° thereby improving ergonomics of the instrument for playing. The instrument may have a joint or guiding member 115 between the first I and second II portions, where the joint or guiding member 115 is advantageously arranged so to make the structure mechanically durable and stiff, but also acoustically so that each of the portions I, II will resonate the other I, II when played.

FIG. 6 illustrates an embodiment of a hollow structure 116 arranged below the table structure for allowing a person entering at least partly inside the instrument. The hollow structure is provided advantageously into a stand portion 117.

Further the instrument 100 may also comprise accessories 118, 119, such as lights 118 and smoke machine 119. The lights are advantageously implemented by LED-lights 118 or laser light source 118 and can be arranged into the deck structure 102 or to the frame structure 105, advantageously to the peripheral area of the elliptical deck structure. In addition or alternatively the lights 118 can be arranged into the hollow structure 116 so inside the instrument and/or to the stand portion 117.

The instrument 100 also advantageously comprises a switch 120 for managing the lights 118 and/or smoke machine 119 on/off, and also turn possible amplifier on/off. The instrument 100 may also comprise a motion detector 121 for detecting in a non-contact way motions, positions and/or gestures of at least one player or person entering or nearby the instrument. The motion detector 121 may be implemented for example by photo or a brightness detectors or by a camera and gesture recognition device as an example, where the motion detector 121 is configured to generate electrical signals based on the detected motions, positions and/or gestures.

In addition the instrument may comprise an interactive device 122 having a library for different responses for accessories, such as lights, smokes and/or effect or resonators based on the detected motions, positions and/or gestures. Advantageously a certain detected movement may respond a certain light, smoke or effect pattern generated by the accessories. For example based on the detected motions, positions and/or gestures a certain effect to acoustics, sound effects, tones, mixing, looping, chorus, stronger sounds and/or directing sounds, lights, smoke or resonation are generated.

The instrument comprises also a controller 123, which is coupled with the motion detector 121 and the interactive device 122. The controller is configured to receive the signals from the motion detector 121 and based on the received signals ask the interactive device 122 for corresponding response. Again based on the corresponding response from the interactive device 122 the controller is configured to control the operation of the accessories, such as the lights 118, smokes 119 and/or effects or resonators 109. Thus for example when the motion detector 121 detects any parameter changing in the environment, such as a coming person or a certain gesture, motion or position of the player, it generates a signal to the controller 123, based on which the controller 123 asks the interactive device 122 the response for the detected parameter change. The interactive device 122 advantageously has in its library a certain response for the accessories as a control data. Alternatively or in addition to the interactive device may generate also random responses as said control data. The interactive device 122 informs the controller by the control data corresponding to the detected parameter change or other ways generated control data. After this the controller 123 controls the corresponding accessories, such as lights, smokes and/or effects or resonators based on the received control data.

Further the instrument 100 may also comprise a memory device 124 and/or data communication device 125 for example for receiving an external control data e.g. from an USB memory device or a via short radio communication link. The external control data may be for example data related to effects or how to control the accessories for example based on the playing or drumming the instrument and/or based on the recognized motions, positions and/or gestures.

Still in addition the instrument may also comprise an automatic tuner mechanism 126 which is mechanically coupled with the string fastening members 101 so the tuner pins. The controller 123 advantageously controls the operation of the automatic tuner mechanism 126 for changing tone of the strings 103 attached to the string fastening members 101. The controller can control the toning based on toning data, which can be previously stored to the memory device 124 or received via the data communication device 125. The data communication device 125 may be implied e.g. by the USB device or via a wireless way, like Bluetooth, WLAN or via mobile communication links, like 4G or the like, as an example. The controller 123 may also store and/or send data related to the current toning for a later use. For example if the player is tuned the instrument for a certain tone, the controller may detect the current toning, compose toning data as a response to the toning and save the toning data to the memory device or sent it to an external device via the communication link, such as via the mobile communication link to a cloud based server. According to an embodiment the toning data can then be load from the cloud based server or via another media by any other players and to the any other instrument for toning said other instrument also for same toning.

Furthermore even if not described elsewhere in this document the instrument can have a single fret, several frets, a fretboard of fretless fingerboard to alter the tunings of the strings while playing. In addition the instrument may have a protecting structure for example under the soundboard or below the table structure for protecting the instrument and components. The protecting structure may be a plate, perforated plate or the like. The soundboard may also be as a box-like soundboard. However the structures are advantageously implemented so that to fit perfectly on different stands or tables. Both the protecting structure as well as the box-like soundboard may be provided to have an acoustic effect but also to protect the instrument as well as the components and structures of the instrument for example during playing and also during transportation and storage.

The invention has been explained above with reference to the aforementioned embodiments, and several advantages of the invention have been demonstrated. It is clear that the invention is not only restricted to these embodiments, but comprises all possible embodiments within the spirit and scope of the inventive thought and the following patent claims. According to an certain determination the instrument may be construed as belonging to a Chordophone zither plucked group.

Furthermore it is to be noted that even if the instrument configured for one or more players is described and especially the string fastening members, which are grouped for at least two physically separate groups thereby providing for at least two different player positions, the instrument can be provided according to the embodiment described in this document in particularly for three, four, five or six players and with three, four, five or six player. Anyhow, these are only examples and still the instrument can be implemented for more players and with more player positions.

Still in addition the accessories, such as light or smoke machines, can be controlled by the interactive device, where the interactive device determines the beat and/or sound effects of the played music and outputs controlling signals based on said beat and/or sound effects of the played music. For example the more faster the beat the more faster the lights are flashed, as an example. In addition it is to be noted that the smoke machine can be either integrated to the instrument or the instrument may have an output for the smoke machine for outputting the smoke machine controlling signals generated by the controller of the instrument.

Furthermore, strings can be e.g. Finnish zither or Kantele strings, guitar or steel guitar strings or other strings selected by the skilled person. In addition, the stings in different groups may be different type strings, such as Finnish zither or Kantele strings, guitar or steel guitar strings, or the like. Still in addition, the instrument can be made of one single piece or of number of layers, such as wood layers with hard wood inserts or other hard material inserts. In addition, it is to be understood that the raw body of the instrument can be machined, such as machining for example excess of wood layers or peripheral areas of the instruments in order to achieve the final shape or device both in acoustically and/or visually. It is also to be understood that the instrument can be played on the table or on the floor or in the arms, for example, or the instrument may comprise own support structure, such as legs.

In addition the features recited in dependent claims are mutually freely combinable unless otherwise explicitly stated.

The invention claimed is:

1. A table stringed musical instrument comprises a deck and plurality of string fastening members arranged to an instrument structure, where said string fastening members are arranged for receiving and fastening plurality of strings to the instrument structure, wherein the instrument is configured for one or more players so that the string fastening members are grouped for at least two physically separate groups and additionally so that the strings to be received and fastened are thereby grouped for at least two separate groups and thereby for at least two different player positions so that the first group of the string fastening members is configured to receive the first group of strings and the second group of the string fastening members is configured to receive the second group of strings, wherein the strings of said first group are different strings than the strings of said second group, and the deck is an oval shape deck for allowing positioning different groups of string fastening members for different area of said deck and thereby for allowing one or more players for playing the different groups of strings in the different player positions, and wherein the string fastening members are arranged to separate groups, wherein the average distance between the closest strings of the adjacent groups is at least 2 times the average length of the adjacent strings in the each individual group.

2. The instrument of claim 1, wherein the table stringed musical instrument is a free stringed musical instrument, where the string to be attached to the two string fastening members is configured to resonate freely at the whole length of said string between said two string fastening members.

3. The instrument of claim 1, wherein the instrument comprises also at least one fingerboard section or at least one percussive structure.

4. The instrument of claim 1, wherein the instrument comprises a resonance or vibrating modulator for vibrating component of the instrument, and thereby generating chorus, stronger sounds or directing sounds, and wherein said resonance or vibrating modulator comprises a magnetic resonance or vibrating modulator having at least one magnetic coil or a rotating permanent magnet arranged for generating changing magnetic field for vibrating component of the instrument and thereby generating said chorus, stronger sounds or directing sounds, wherein the component to be vibrated comprises the strings or magnetic material comprised by the instrument.

5. The instrument of claim 3, wherein percussive structure comprises different building material than the rest of said instrument or same building material than the rest of said instrument but with different density or other properties than the rest of said deck, thereby configured to generate different sound in response to an impact.

6. The instrument of claim 1, wherein the table structure of said instrument is divided physically in first and second portions along a dividing line and wherein the first group of the string fastening members is arranged in said first portion and the second group of the string fastening members is arranged in said second portion.

7. The instrument of claim 6, wherein said instrument in configured to be folded along said dividing line so that the first and second portions are configured to form at least two different modes, where the first mode is a playing mode and the second mode is a transportation mode of the instrument.

8. The instrument of claim 6, wherein said instrument comprises a joint member between said first and second portions, wherein said joint member is configured to connect said first and second portions to each other acoustically, and wherein said joint member comprises a hollow tube or material having greater density than the base material of the first and second portions.

9. The instrument of claim 1, wherein the instrument comprises a hollow structure below the table structure for allowing a person entering at least partly inside the instrument and thereby allowing comprehensive musical experience.

10. The instrument of claim 1, wherein the instrument comprises lights, or LED lights, which are configured to be activated when a person is entering near the instrument.

11. The instrument of claim 9, wherein the instrument comprises lights, or LED-lights, inside the instrument, which are configured to be activated when a person is entering inside the instrument.

12. The instrument of claim 1, wherein the instrument comprises a motion detector for detecting motions, positions or gestures of at least one player and based on at least one of them to generate signals responding the detected motions, positions or gestures, whereupon accessories of the instrument are controlled based on said signals generated.

13. The instrument of claim 11, wherein the instrument comprises an interactive device for providing interactivity between the instrument and the player so that the interactive device is configured to generate control signals for controlling the accessories based on said detected motions, positions or gestures of at least one player in order to control effects to acoustics, sound effects, tones, mixing, looping, chorus, stronger sounds, lights, smokes or directing sounds.

14. The instrument of claim 1, wherein the different groups of said string fastening members are configured to be tuned together with the strings fixed to said string fastening members so to form differentially tuned playing entity.

15. The instrument of claim 1, wherein the instrument comprises a soundboard, which is either permanently integrated, a unified structure with the instrument structure or attached in a detachable way to the instrument structure.

16. The instrument of claim 1, wherein the construction material of the instrument comprises heat-treated wood, natural fiber component, homogenized wood or dry wood.

17. A method for manufacturing a table stringed musical instrument comprising a deck and plurality of string fastening members arranged to an instrument structure, where said string fastening members are arranged for receiving and fastening plurality of strings to the instrument structure, wherein the instrument is configured for one or more players so that the string fastening members are grouped for at least two, physically separate groups and additionally so that the strings to be received and fastened are thereby grouped for at least two separate groups and thereby for at least two different player positions so that the first group of the string fastening members is configured to receive the first group of strings and the second group of the string fastening members is configured to receive the second group of strings, wherein the strings of said first group are different strings than the strings of said second group, and the deck is an oval shape deck for allowing positioning different groups of string fastening members for different area of said deck and thereby for allowing one or more players for playing the different groups of strings in the different player positions, wherein the string fastening members are arranged to separate groups, wherein the average distance between the closest strings of the adjacent groups is at least 2 times the average length of the adjacent strings in the each individual group.

18. A table stringed musical instrument comprises a deck and plurality of string: fastening members arranged to an instrument structure, where said string fastening members are arranged for receiving and fastening plurality of strings to the instrument structure, wherein the instrument is configured for one or more players so that the string fastening members are grouped for at least two physically separate groups and additionally so that the strings to be received and fastened are thereby grouped for at least two separate groups and thereby for at least two different player positions so that the first group of the string fastening members is configured to receive the first group of strings and the second group of the string fastening members is configured to receive the second group of strings, wherein the strings of said first group are different strings than the strings of said second group, and the deck is an oval shape deck for allowing positioning different groups of string fastening members for different area of said deck and thereby for allowing one or more players for playing the different groups of strings in the different player positions, wherein the table structure of said instrument is divided physically in first and second portions along a dividing line and wherein the first group of the string fastening members is arranged in said first portion and the second group of the string fastening members is arranged in said second portion.

19. The instrument of claim 18, wherein said instrument in configured to be folded along said dividing line so that the first and second portions are configured to form at least two different modes, where the first mode is a playing mode and the second mode is a transportation mode of the instrument.

20. The instrument of claim 18, wherein said instrument comprises a joint member between said first and second portions, wherein said joint member is configured to connect said first and second portions to each other acoustically, and wherein said joint member comprises a hollow tube or material having greater density than the base material of the first and second portions.

* * * * *